United States Patent
Yuk et al.

(10) Patent No.: US 9,137,852 B2
(45) Date of Patent: Sep. 15, 2015

(54) DATA COMMUNICATION METHOD AND APPARATUS VIA INTERLOCK BETWEEN HETEROGENEOUS NETWORKS IN RADIO ACCESS SYSTEM SUPPORTING MULTI RADIO ACCESS TECHNOLOGY

(75) Inventors: Youngsoo Yuk, Anyang-si (KR); Eunjong Lee, Anyang-si (KR); Inuk Jung, Anyang-si (KR); Heejeong Cho, Anyang-si (KR); Jinsam Kwak, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 124 days.

(21) Appl. No.: 13/978,499

(22) PCT Filed: Jan. 6, 2012

(86) PCT No.: PCT/KR2012/000142
§ 371 (c)(1),
(2), (4) Date: Jul. 5, 2013

(87) PCT Pub. No.: WO2012/093882
PCT Pub. Date: Jul. 12, 2012

(65) Prior Publication Data
US 2013/0287014 A1    Oct. 31, 2013

Related U.S. Application Data

(60) Provisional application No. 61/430,170, filed on Jan. 6, 2011, provisional application No. 61/475,236, filed on Apr. 14, 2011.

(51) Int. Cl.
*H04W 88/06* (2009.01)
*H04W 48/08* (2009.01)
(52) U.S. Cl.
CPC .............. *H04W 88/06* (2013.01); *H04W 48/08* (2013.01)

(58) Field of Classification Search
CPC ...... H04W 72/04; H04W 68/02; H04W 48/18
USPC .................................................. 370/328–338
See application file for complete search history.

(56) References Cited

U.S. PATENT DOCUMENTS

2008/0212516 A1* 9/2008 Son et al. ...................... 370/315
2011/0134774 A1* 6/2011 Pelletier et al. ............... 370/252
(Continued)

FOREIGN PATENT DOCUMENTS

KR    10-2008-0062352    7/2008
KR    10-2009-0006122    1/2009
(Continued)

OTHER PUBLICATIONS

Lee et al., Dec. 2, 2010, U.S. Appl. No. 61/418,869, Specification, Page Range21 pages.*

(Continued)

*Primary Examiner* — Charles C Jiang
*Assistant Examiner* — Kyaw Z Soe
(74) *Attorney, Agent, or Firm* — Lee, Hong, Degerman, Kang & Waimey

(57) ABSTRACT

The present invention relates to a method for transmitting and receiving data via a first base station supporting a first radio access technology (RAT) and a second base station supporting a second RAT in a radio access system supporting a multi-radio access technology, and the method may include performing a network (re)entry procedure with the first base station; receiving control information required for an access to the second base station located in the vicinity of the first base station from the first base station; performing a scanning procedure for at least one second base station located in the vicinity of the first base station; receiving an instruction message instructing an access to the second base station from the first base station; and performing an access procedure with the second base station.

17 Claims, 6 Drawing Sheets

(56) References Cited

U.S. PATENT DOCUMENTS

| | | |
|---|---|---|
| 2011/0149894 A1* | 6/2011 | Luo et al. .................. 370/329 |
| 2011/0200006 A1* | 8/2011 | Kwon et al. ............... 370/331 |
| 2013/0252608 A1* | 9/2013 | Lee et al. .................. 455/434 |

FOREIGN PATENT DOCUMENTS

| | | | |
|---|---|---|---|
| KR | 10-2009-0012478 | 2/2009 | |
| WO | WO 2009113782 A2 * | 9/2009 | ........... H04W 36/14 |
| WO | 2009/139934 | 11/2009 | |

OTHER PUBLICATIONS

PCT International Application No. PCT/KR2012/000142, Notification of Transmittal of The International Search Report and The Written Opinion of The International Searching Authority, or The Declaration dated Sep. 12, 2012, 9 pages.

* cited by examiner

[Fig. 1A]
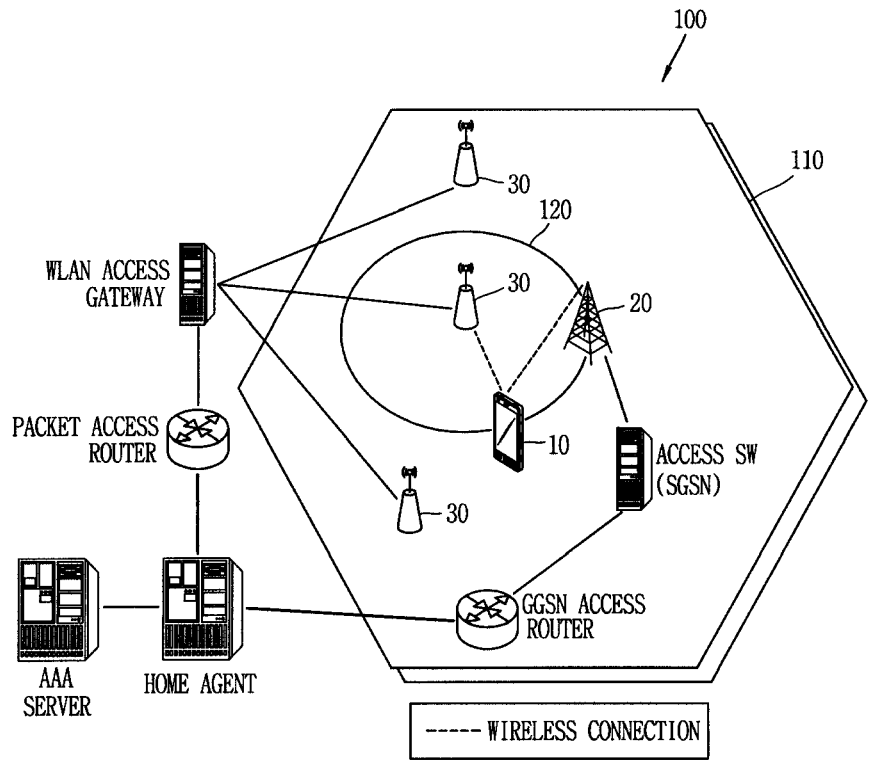
[Fig. 1B]
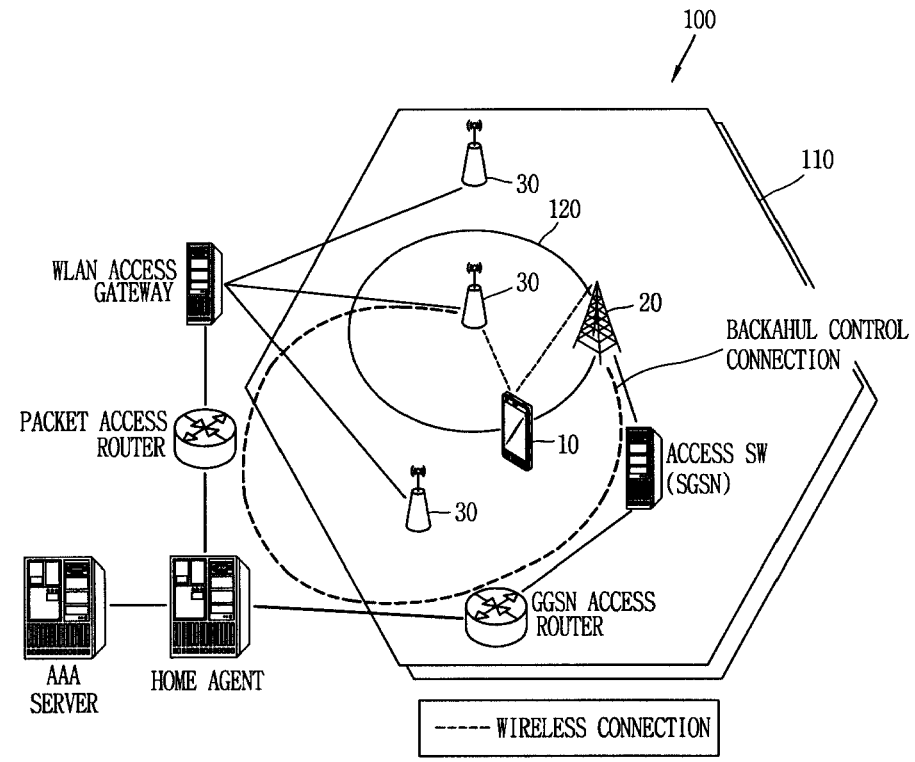

[Fig. 1C]
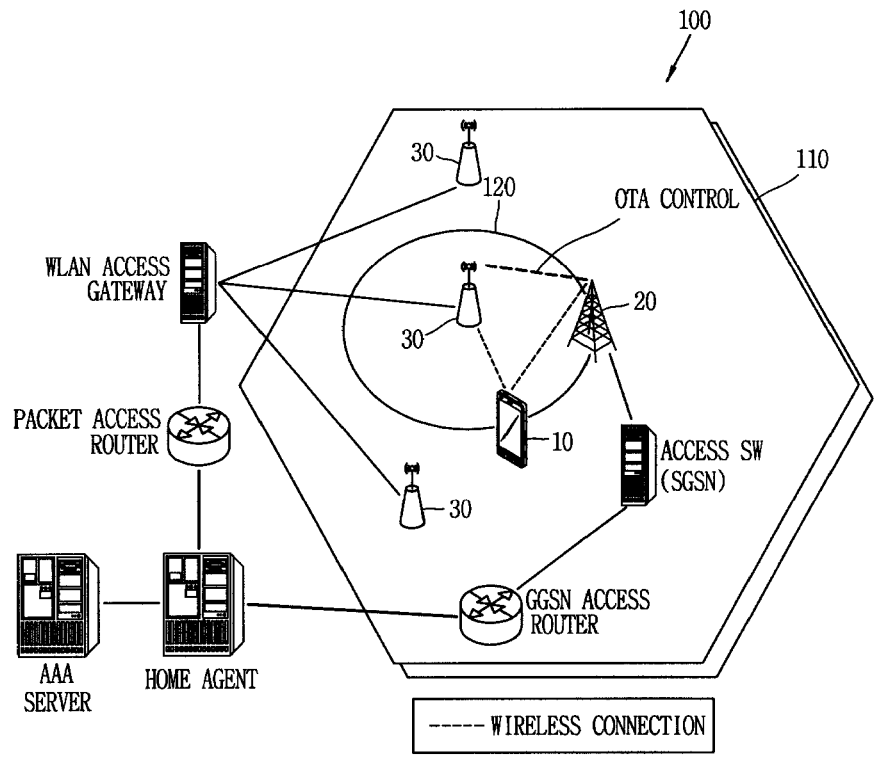
[Fig. 1D]
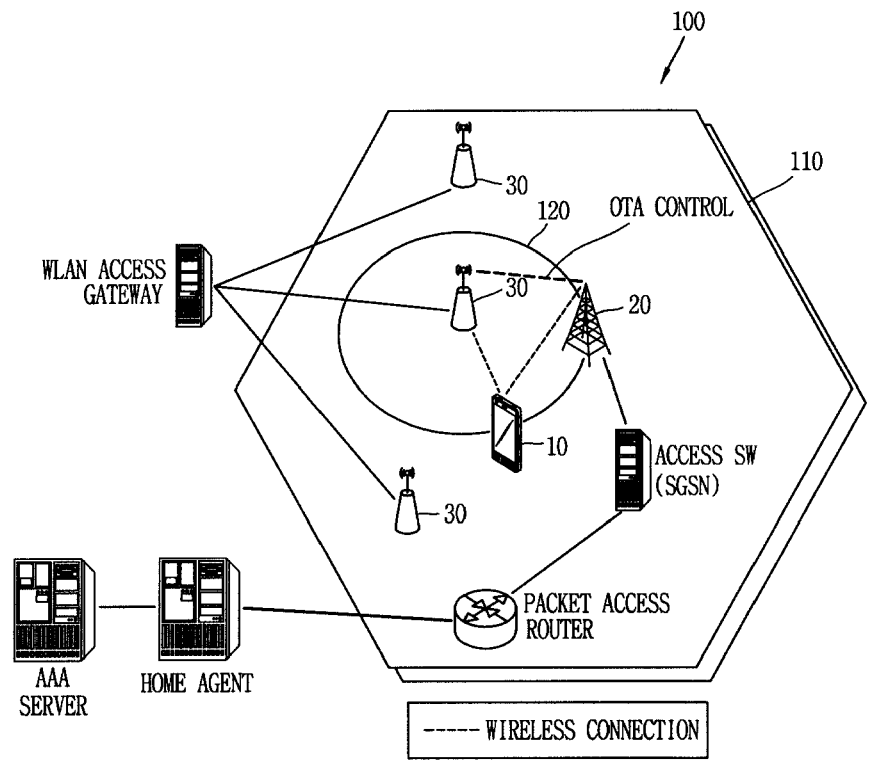

[Fig. 2]
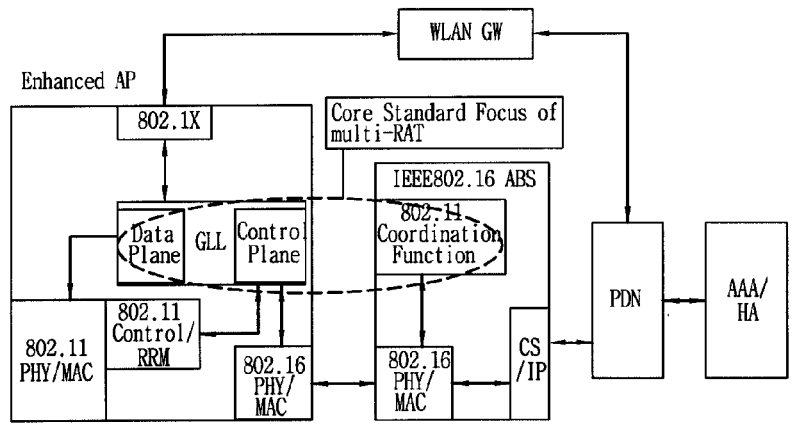
[Fig. 3A]
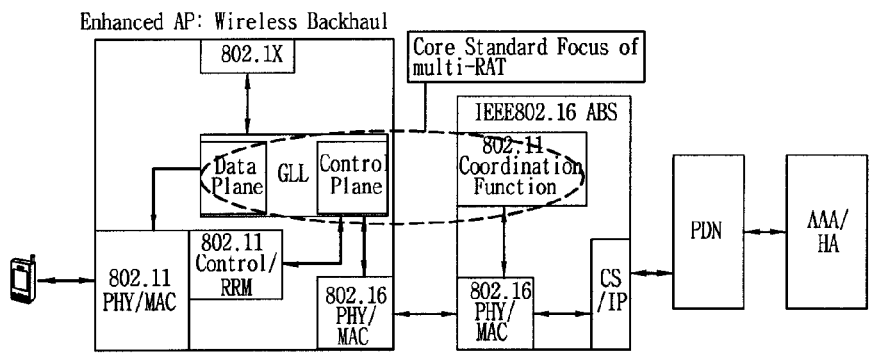
[Fig. 3B]
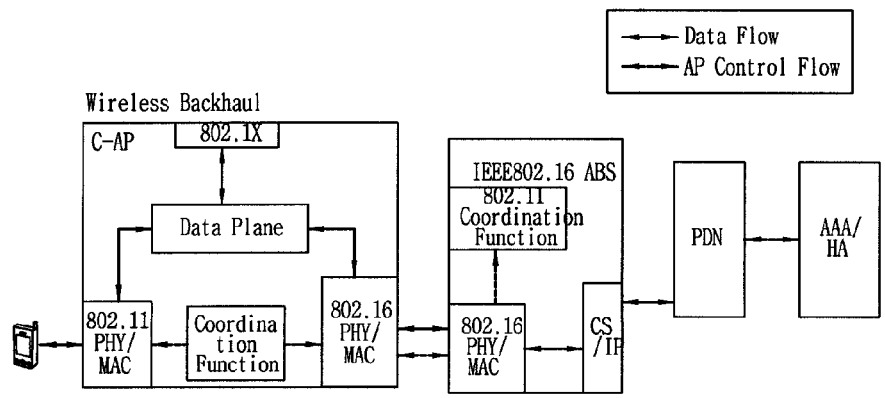
[Fig. 4]
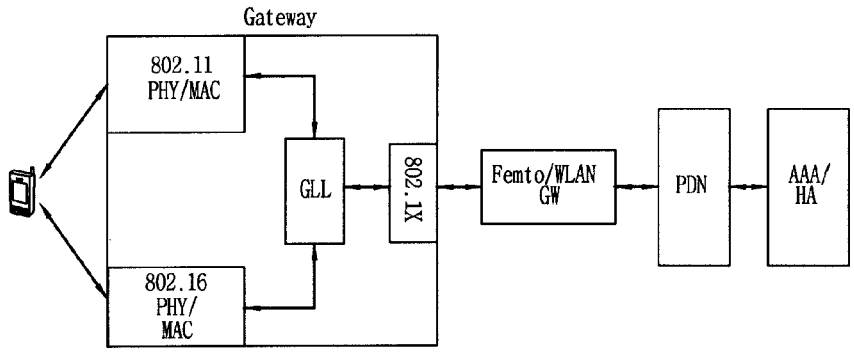

[Fig. 5A]
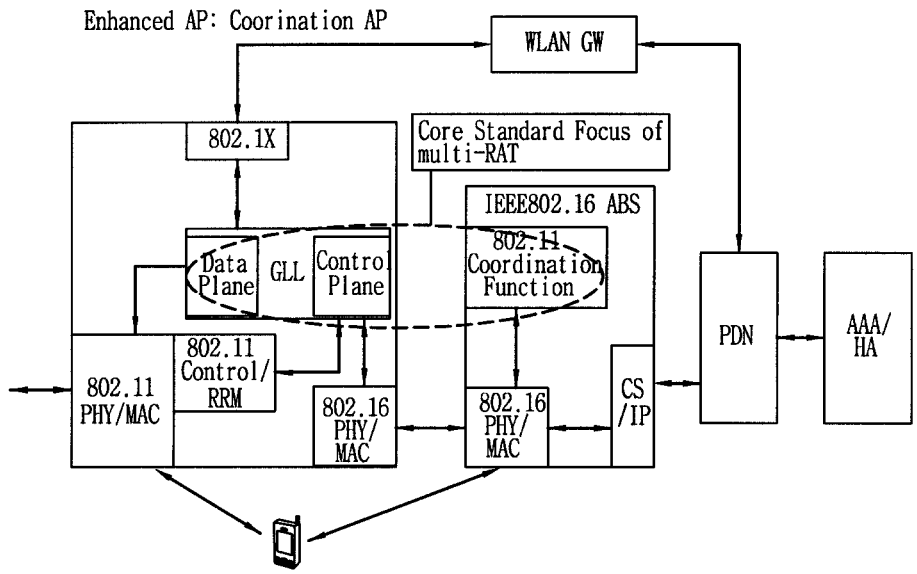
[Fig. 5B]
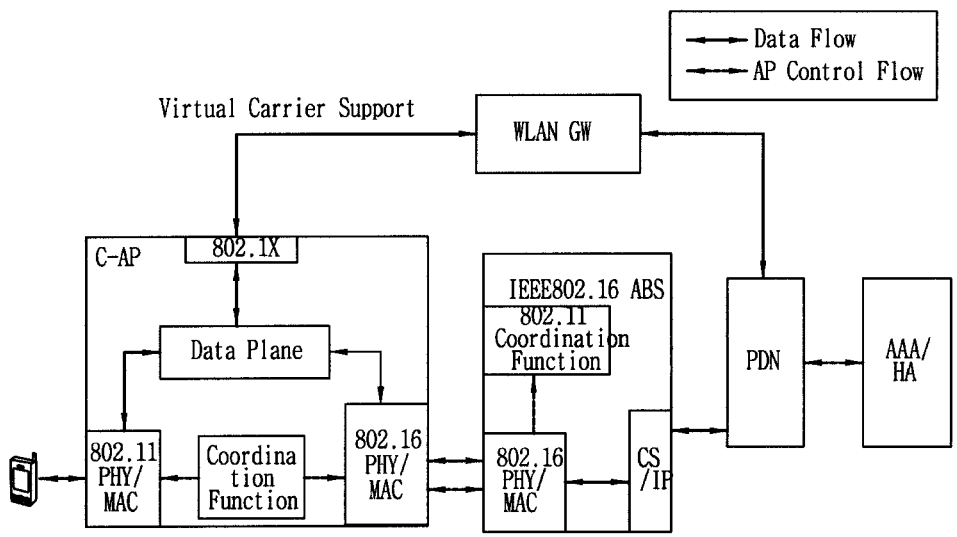

[Fig. 6]
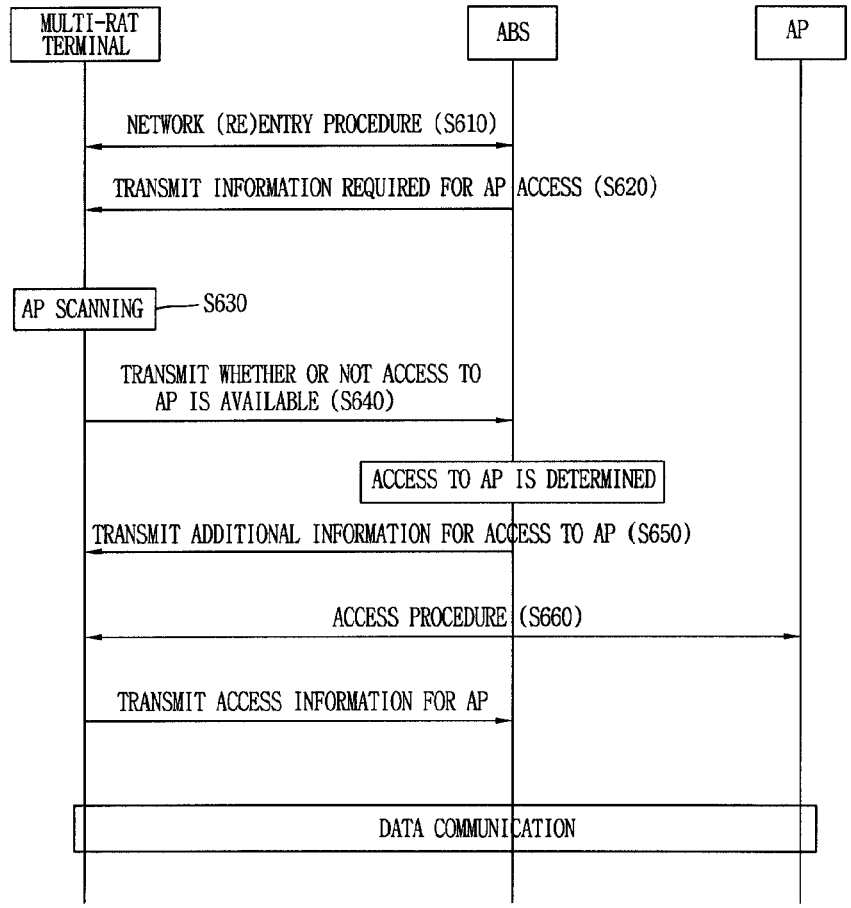
[Fig. 7]
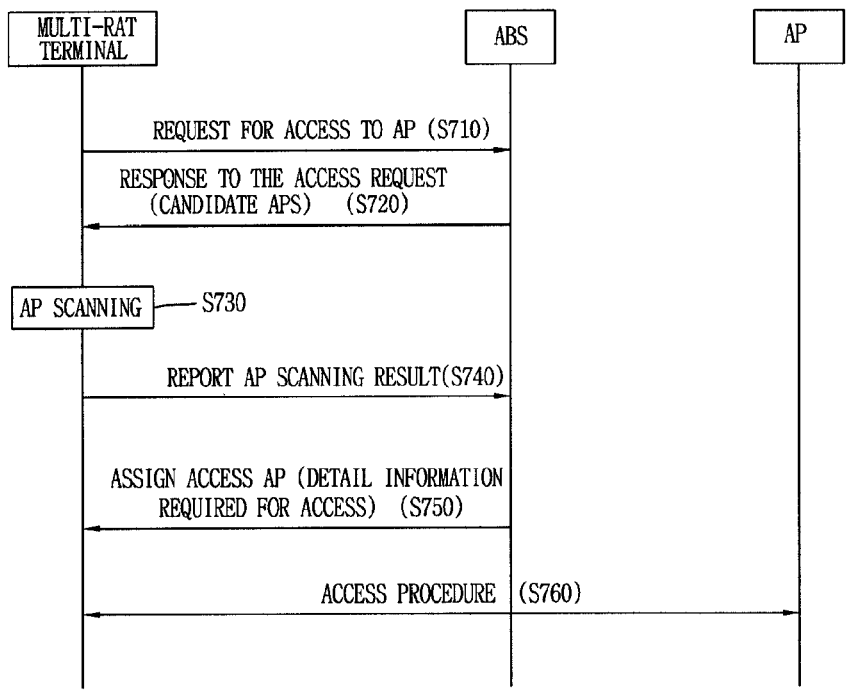

[Fig. 8]
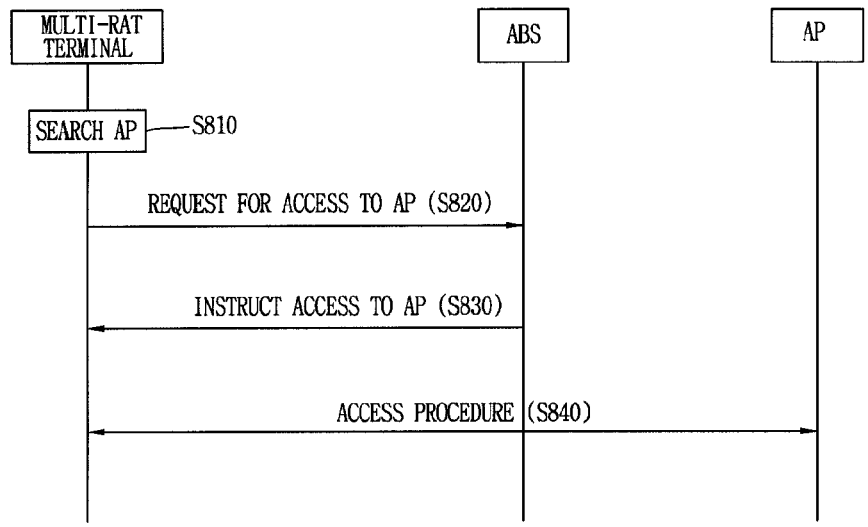
[Fig. 9]
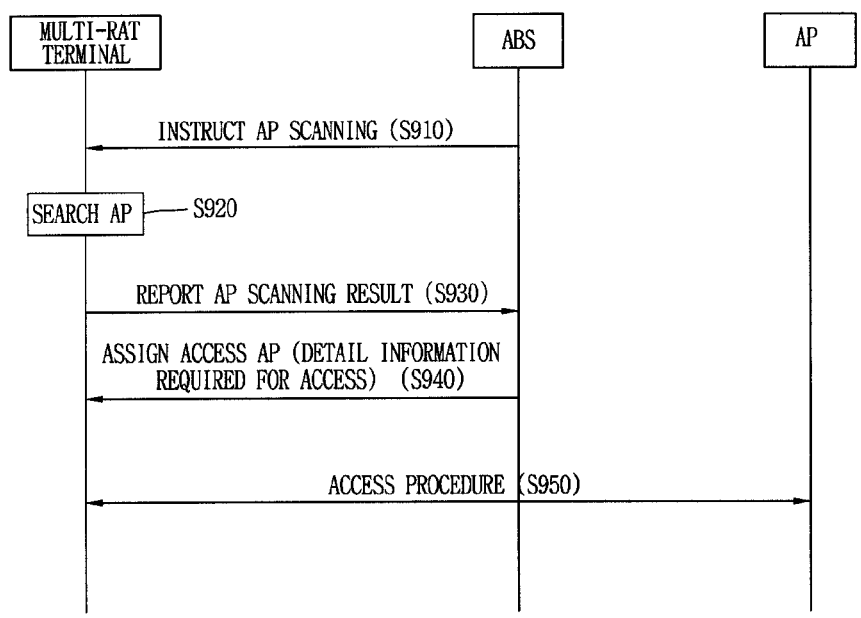
[Fig. 10]
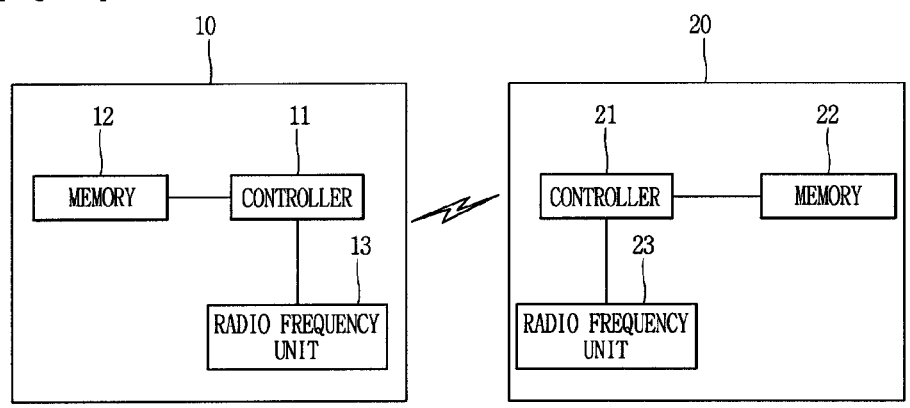

DATA COMMUNICATION METHOD AND APPARATUS VIA INTERLOCK BETWEEN HETEROGENEOUS NETWORKS IN RADIO ACCESS SYSTEM SUPPORTING MULTI RADIO ACCESS TECHNOLOGY

CROSS-REFERENCE TO RELATED APPLICATIONS

This application is the National Stage filing under 35 U.S.C. 371 of International Application No. PCT/KR2012/000142, filed on Jan. 6, 2012, which claims the benefit of U.S. Provisional Application Ser. No. 61/430,170, filed on Jan. 6, 2011, and U.S. Provisional Application Ser. No. 61/475,236, filed on Apr. 14, 2011, the contents of which are all hereby incorporated by reference herein in their entirety.

TECHNICAL FIELD

The present disclosure relates to a multi-RAT system, and more particularly, to a method and apparatus for performing data communication via interlock or coordination between heterogeneous networks.

BACKGROUND ART

Multi-RAT Network (or System)

Multi radio access technology (multi-RAT) network is a wireless communication environment in which there exist two or more heterogeneous networks, and a terminal can access two or more heterogeneous networks to simultaneously perform communication.

Heterogeneous network (or heterogeneous system) refers to a network using a communication scheme which is different from that of a specific network on the basis of the specific network. For example, a WiMAX network which is an example of a mobile communication system and a Wi-Fi network which is an example of WLAN may be heterogeneous networks with respect to each other.

Further, RAT is a technology type used in radio access. For example, RAT may include GSM/EDGE Radio Access Network (GERAN), UMTS Terrestrial Radio Access Network (UTRAN), Evolved-UMTS Terrestrial Radio Access Network (E-UTRAN), WiMAX, LTE(-A), WiFi, and the like. In other words, GERAN, UTRAN, E-UTRAN, WiMAX and/or WiFi may be intermixed in the same area.

In addition, a terminal capable of accessing two or more heterogeneous networks to perform communication, i.e., capable of supporting multi-RAT, may be referred to as a "multi-system terminal" or "multi-mode terminal."

In recent years, terminals supporting both a cellular network and WLAN have been typically on the market in a broadband wireless communication system. Each system has different characteristics (advantages or disadvantages), and thus may perform a complementary operation, thereby providing enhanced services. The following Table 1 illustrates the characteristics of a cellular network and WLAN.

Table 1

TABLE 1

| | Pros | Cons | Note |
|---|---|---|---|
| WLAN | Higher BW- Low cost for deployment- Low overhead for maintaining connections- Low access delay for random access with small number of MSs | Uncontrolled Mobility- No connection management- Limited QoS support- High power consumption for network discovery - Hard to managing interference- Severe performance degradation with the large number of MSs | WLAN provides - Higher BW/Low latencyCellular provides - QoS support- Mobility/ connection management- Coordinates the devices to connect WLAN |
| Cellular | Mobility Management- Guaranteed QoS support Secure transmission | Higher access delay for scheduled access- Large control overhead for data transmission | |

A multi-RAT terminal may typically perform communication via a cellular network, but may also transmit and receive data by using WLAN AP when the WLAN AP is located in the vicinity. Even in this case, when WLAN cannot support QoS in case of a service in which the QoS should be guaranteed such as a phone service, the multi-RAT terminal may transmit data via a cellular network. In other words, a multi-RAT terminal can perform data communication using a more excellent network, and in the aspect of a system, high-speed data transmission is dispersed into WLAN, thereby increasing an overall system efficiency.

However, even if the terminal has a capability for accessing multi-radio access technology (multi-RAT) in a wireless communication environment supporting two or more heterogeneous networks in the related art, it may be impossible to simultaneously transmit and receive data via two or more heterogeneous networks by simultaneously accessing multi-radio access technology. In other words, in case of a terminal supporting multi-radio access technology in the related art, any one wireless access technology is accessed based on a switching mechanism to transmit or receive data via one network. Accordingly, when a terminal having multi-RAT capability transmits and receives data via a specific network and then via a network which is different from the specific network, data transmission and reception via either one network should be terminated.

In other words, according to the related art, a terminal having capability supporting two or more heterogeneous networks can perform communication using different networks, but operates based on a simple switching mechanism, thereby having a limit in the efficiency. For example, since different networks are operated in an independent manner, the management may be inefficiently carried out in the aspect of security/authentication, IP flow mobility, network discovery, and the like.

DISCLOSURE OF INVENTION

Solution to Problem

An aspect of the present disclosure is to provide a method in which a multi-RAT terminal can simultaneously transmit and receive data via both a cellular network and WLAN.

Furthermore, another aspect of the present disclosure is to provide a method in which a cellular network and WLAN can transmit and receive data in coordination (or interlock) with each other. In particular, there is provided a method in which a multi-RAT terminal can simultaneously transmit and receive data via both a cellular network and WLAN under the control of a cellular network.

In addition, still another aspect of the present disclosure is to define the structure and operation for an AP (C-AP) of WLAN in coordination with a cellular network.

According to the present disclosure, there is provided a method for allowing a terminal to perform data communication via a first base station supporting a first radio access technology (RAT) and a second base station supporting a second RAT in a radio access system supporting a multi-radio access technology, the method comprising: performing a network (re)entry procedure with the first base station; receiving control information required for an access to a second base station located in the vicinity of the first base station from the first base station; performing a scanning procedure for at least one second base station located in the vicinity of the first base station; receiving an instruction message instructing an access to the second base station from the first base station; and performing an access procedure with the second base station.

Furthermore, the method may be characterized in that the control information comprises at least one of a Service Set IDentifier (SSID), a MAC address, a Wired Equivalent Privacy (WEP) key, frequency information, frequency hopping information, protocol version information, and offset information between a frame of the first base station and a beacon frame of second base stations in the vicinity of the first base station.

Furthermore, the method may be characterized in that further comprising: requesting an access to a second base station located in the vicinity of the first base station to the first base station, wherein said performing a scanning procedure comprises: performing scanning for second base stations located in the vicinity of the first base station, and transmitting the scanning execution result to the first base station.

Furthermore, the method may be characterized in that said performing a scanning procedure comprises: receiving a message instructing scanning execution for second base stations in the vicinity of the first base station from the first base station; performing scanning for second base stations in the vicinity of the first base station; and transmitting the scanning execution result to the first base station.

Furthermore, the method may be characterized in that further comprising: performing data communication via a first carrier with the first base station; and performing data communication via a second carrier with the accessed second base station.

Furthermore, the method may be characterized in that the first RAT is a radio access technology supporting a cellular system, and the second RAT is a radio access technology supporting a wireless local area network (WLAN).

Furthermore, the method may be characterized in that the first base station and the second base station are connected to each other over wired or wireless connections.

Furthermore, the method may be characterized in that the control information further comprises a second base station identification signal capable of identifying each second base station located in the vicinity of the first base station.

Furthermore, the method may be characterized in that the control information further comprises information indicating a data transmission point of the second base station.

Furthermore, the method may be characterized in that the information indicating a data transmission point of the second base station is received through a Physical Downlink Control CHannel (PDCCH) or Advanced MAP (A-MAP).

Furthermore, the method may be characterized in that the PDCCH or the A-MAP is CRC masked with a STation IDentifier (STID) or Cell Radio Network Temporary Identifier (C-RNTI).

Furthermore, the method may be characterized in that information for notifying multi-radio access technology (multi-RAT) support is transmitted to the first base station through the network (re)entry procedure.

Furthermore, according to the present disclosure, there is provided a method for transmitting and receiving data via a first base station supporting a first radio access technology (RAT) and a second base station supporting a second RAT in a radio access system supporting a multi-radio access technology, the method comprising: allowing the second base station to perform a registration procedure with the first base station; allowing the second base station to transmit a beacon frame to a terminal supporting multi-RAT (multi-RAT terminal); performing an access procedure with the multi-RAT terminal; and performing data communication via a virtual carrier with the multi-RAT terminal; wherein said performing a registration procedure comprises: searching a first base station capable of communicating with the second base station; and registering to the searched first base station using an MAC message.

Furthermore, the method may be characterized in that a transmission period of the beacon frame and a transmission period of a downlink frame or downlink sub-frame of the first base station have relative timing offset interval, and the virtual carrier is distinguished from a carrier performing data communication between the first base station and the multi-RAT terminal.

Furthermore, the method may be characterized in that information required for an access to the multi-RAT terminal is exchanged with the first base station, and the information required for the access comprises at least one of location information of the second base station and information on second base stations located in the vicinity of the second base station.

Furthermore, a terminal is provided for transmitting and receiving data via a first base station supporting a first radio access technology (RAT) and a second base station supporting a second RAT in a radio access system supporting a multi-radio access technology, the terminal comprising: a wireless communication unit configured to transmit and receive wireless signals; and a controller that controls the wireless communication unit, wherein the controller performs a network re-entry procedure with the first base station, controls the wireless communication unit to receive control information from the first base station that is required to access the second base station located in the vicinity of the first base station, performs a scanning procedure for at least one second base station located in the vicinity of the first base station, controls the wireless communication unit to receive an instruction message from the first base station that requests access to the second base station, and performs an access procedure with the second base station.

BRIEF DESCRIPTION OF DRAWINGS

FIGS. 1A through 1D are conceptual views illustrating a multi-RAT system to which an embodiment of the present disclosure is applicable.

FIG. 2 is a view illustrating the logical structure of a C-AP according to an embodiment of the present disclosure.

FIGS. 3A and 3B are structural views illustrating a multi-RAT system when the C-AP is operated in a wireless backhaul mode.

FIG. 4 is an example of the structural view illustrating a multi-RAT system when the C-AP is operated in a converged gateway mode.

FIGS. 5A and 5B are structural views illustrating a multi-RAT system when the C-AP is operated in coordinated AP mode.

FIG. 6 is a flow chart illustrating a data communication method of a multi-RAT terminal in a multi-RAT network according to an embodiment of the present disclosure.

FIG. 7 is a flow chart illustrating the first embodiment.

FIG. 8 is a flow chart illustrating the second embodiment.

FIG. 9 is a flow chart illustrating the third embodiment.

FIG. 10 is an internal block diagram illustrating a terminal and a base station in a multi-RAT system to which an embodiment of the present disclosure is applicable.

MODE FOR THE INVENTION

The following technology may be used in various wireless communication systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like.

CDMA may be implemented with a radio technology such as Universal Terrestrial Radio Access (UTRA) or CDMA2000. TDMA may be implemented with a radio technology such as Global System for Mobile communications (GSM)/General Packet Radio Service (GPRS)/Enhanced Data Rates for GSM Evolution (EDGE). OFDMA may be implemented with a radio technology such as IEEE 802.11 (Wi-Fi), IEEE 802.16 (WiMAX), IEEE 802-20, Evolved UTRA (E-UTRA) and the like. IEEE 802.16m is an evolution of IEEE 802.16e, providing backward compatibility with an IEEE 802.16e-based system.

UTRA is part of Universal Mobile Telecommunications System (UMTS).

rd Generation Partnership Project (3GPP) Long Term Evolution (LTE) is part of Evolved UMTS (E-UMTS) using Evolved-UMTS Terrestrial Radio Access (E-UTRA), employing OFDMA in the downlink and SC-FDMA in the uplink. LTE Advanced (LTE-A) is an evolution of 3GPP LTE.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the concept of the invention, and therefore, they should not be construed to limit the concept of the invention by the accompanying drawings. The concept of the invention should be construed as being extended to all modifications, equivalents, and substitutes in addition to the accompanying drawings.

Hereinafter, a method in which a multi-RAT terminal transmits and receives data via coordination (or interlock) between heterogeneous networks in a multi-RAT network proposed by the present disclosure will be described in detail.

FIGS. 1A through 1D are conceptual views illustrating a multi-RAT system to which an embodiment of the present disclosure is applicable.

As illustrated in FIGS. 1A through 1D, a multi-RAT network 100 may include a primary system 110 and a secondary system 120.

The primary system 110 may include a multi-RAT terminal 10, a first base station 20, and a second base station 30. Furthermore, the primary system may refer to a system which always has a status with the multi-RAT terminal. In other words, the primary system may refer to a system maintaining an activated state, a sleep mode state or an idle mode state with the multi-RAT terminal.

The secondary system 120 may include a multi-RAT terminal 10 and a second base station 30.

Furthermore, the secondary system may refer to a system that can be added or removed to or from a multi-RAT network as occasion demands. Furthermore, the secondary system may be mainly used to transmit and receive data requiring a higher bandwidth (BW). Accordingly, a specific flow (QoS) may be mapped to use the secondary system. Here, the base station of the secondary system, namely, the second base station, may operate in a similar manner to a terminal having the capability of performing communication with the primary system.

The primary system and secondary system may be operated in interlock with a provider's network. The primary system 110 and secondary system 120 may be expressed as a primary network and secondary network, respectively. Hereinafter, for the sake of brevity of explanation, the primary system represents a "cellular system", and the secondary system represents "WLAN", for example.

Furthermore, a base station (first base station) corresponding to the cellular system and a base station (second base station) corresponding to the WLAN will be expressed as an "ABS" and an "AP", respectively. Furthermore, an access to the cellular system and to the WLAN may denote an access to an ABS and to an AP, respectively.

Referring to FIG. 1A, a cellular system and WLAN may be interlocked with the same core network via each gateway (WLAN Access Gateway (WAG), Access GW (SGSN)). In other words, the multi-RAT terminal can simultaneously transmit and receive data via both a cellular system and WLAN having the same core network.

Furthermore, referring to FIGS. 1B through 1D, a cellular system and WLAN may be connected via a wired connection (backhaul control connection; FIG. 1B) or wireless connection (Over-The-Air (OTA); FIGS. 1C/1D) in a multi-RAT network to be in coordination or interlock with each other. In other words, the ABS 20 and AP 30 may be connected to each other via wired or wireless connections over a backbone network.

In particular, as illustrated in FIGS. 1C and 1D, the AP interlocking with the ABS via the Over-The-Air (OTA) may be expressed as a "coordinated AP (C-AP)" or "Enhanced AP".

Hereinafter, the logical structure and operation mode of a C-AP for allowing a multi-RAT terminal to simultaneously transmit and receive data via both a cellular network and WLAN will be described in detail with reference to FIGS. 2 through 5.

FIG. 2 is a view illustrating the logical structure of a C-AP according to an embodiment of the present disclosure.

Referring to FIG. 2, the C-AP may include at least one of an 802.11 PHY/MAC entity, a coordination function entity, an 802.16 PHY/MAC entity, an 802.11 control/RRM entity, a data plane, GLL, and a control plane. As illustrated in FIG. 2, it is seen that C-AP is interlocked with the ABS via the 802.16 PHY/MAC and control plane.

FIGS. 3 through 5 illustrate a control and data flow for performing communication with a cellular system and WLAN according to the operation mode of C-AP.

First, FIGS. 3A and 3B are structural views illustrating a multi-RAT system when the C-AP is operated in a wireless backhaul mode.

The wireless backhaul mode is a mode in which WLAN is connected to a multi-RAT terminal, and connected to a cellular network via wireless backhaul for operation.

Referring to FIGS. 3A and 3B, it is seen that the C-AP performs data communication with a multi-RAT terminal, and communication between the C-AP and the multi-RAT terminal is controlled by the ABS.

FIG. 4 is an example of the structural view illustrating a multi-RAT system when the C-AP is operated in a converged gateway mode.

The converged gateway mode is a mode in which a multi-RAT terminal is connected to both WLAN and a cellular system, and connected to a wired IP backhaul for operation.

Referring to FIG. 4, it is seen that a multi-RAT terminal simultaneously transmits and receives data corresponding to 802.11 and 802.16 with the C-AP.

FIGS. 5A and 5B are structural views illustrating a multi-RAT system when the C-AP is operated in coordinated AP mode.

Referring to FIGS. 5A and 5B, a multi-RAT terminal may transmit and receive data via the C-AP and ABS, respectively. Here, the ABS transmits and/or receives control signals to and/or from the C-AP via the 802.16 PHY/MAC entity (or 802.11 coordination function entity) to control the C-AP. In other words, the ABS and C-AP are interlocked with each other to perform data communication with the multi-RAT terminal.

Furthermore, the multi-RAT terminal may perform data communication with C-AP using a virtual carrier. The virtual carrier may refer to a carrier distinguished from a carrier via which the multi-RAT terminal performs data communication with the ABS.

Hereinafter, an interlock (or coordination) procedure between the ABS and C-AP and coordination functions enabled due to this procedure, and a standard issue related to the C-AP in a multi-RAT system will be described.

1. Access Information can be Shared

A C-AP can have a relation with the ABS including the C-AP via an 802.16 link. Accordingly, the C-AP is turned on and then searches an ABS that can be communicated with. Subsequently, when the ABS is searched, then the C-AP registers the C-AP to the ABS. Through an interaction between the C-AP and ABS, the ABS can make a list of C-APs within the coverage of the ABS without assistance of a network operator.

Furthermore, the C-AP can receive information, such as location information, neighbor AP information, a wireless configuration parameter, and the like, from the ABS. Furthermore, the mobility of WLAN controlled by the ABS may be implemented via interlock between the ABS and C-AP.

The ABS may provide access information on the APs of the WLAN to a multi-RAT terminal connected to the ABS through information exchanged between the ABS and C-AP. The multi-RAT terminal can reduce power consumption for detecting the APs of the WLAN through the access information received from the ABS.

Furthermore, the C-AP may provide access information on the ABS to a multi-RAT terminal. In this case, fast handover between the ABS and AP can be carried out.

2. Frame Correspondence (or Alignment) Between ABS and C-AP

Frame timings between the ABS and AP are allowed to correspond to each other to facilitate an interlock between the ABS and C-AP, and alleviate inter-AP interference. When a beacon signal broadcast by the C-AP corresponds to a DL sub-frame of the ABS, a multi-RAT terminal is not necessarily required to use a CLC mode to receive a beacon.

Furthermore, a beacon timing distributed between C-APs may have a small search interval for frame timing correspondence between the ABS and C-AP. Through this, multi-RAT terminal can easily detect beacons.

3. Inter-AP Coordination

The management function for Inter-AP Protocol (IAPP) and multiple AP environments may be supported in the standard of 802.11f/v.

Since neighbor APs may use different frequency channels, it may be difficult to communicate between the neighbor APs. Here, the ABS may be a hub for communication between the APs, and may be a central controller to control all the APs.

The ABS having such a communication link may provide the following flexibility to a WLAN network.

(1) Coordinated Dynamic Channel Switching

The base station may allow the C-AP to be switched to a frequency channel having the least channel interference to transmit data.

(2) Coordinated Dynamic Adjustment of Transmission Power

Currently, APs may be configured to transmit data at the maximum power all the time, but through this, the transmission power of the C-AP can be adjusted according to the location and interference level of neighbor C-APs.

(3) Coordinated Dynamic Timing Adjustment

The beacon transmission timings of C-APs may be configured to differ from one another to prevent collision while transmitting beacon signals, and thus the terminal can receive the beacon signals of several C-APs located in the vicinity with no collision.

(4) Coordinated Capacity Sharing Among APs

It may be possible to make a control such that several terminals are dispersed to access neighbor C-APs according to a current load condition of each C-AP.

4. Converged QoS/Connection Management

Converged security and IP flow mobility has been discussed in the standard, but a discussion of coordination between the ABS and C-AP has been limited.

A cellular network and WLAN can share the context and security of a multi-RAT terminal, and provide easier interworking for QoS and connection management through this.

(1) QoS/Connection Management

Prioritized AMS scheduling, QoS provisioning for offloading (2) IP Flow

Integrated security association, IP flow mobility support

5. C-AP Related Standard Issues (1) Protocols Between ABS and C-AP

A new MAC control message may be defined to transmit and receive a configuration parameter and a negotiation parameter between the ABS and C-AP.

In other words, a registration MAC message may be defined to register the C-AP to the ABS.

Furthermore, a configuration MAC message may be defined to configure the C-AP (for example, AP power, timing, operation mode, etc.).

Furthermore a C-AP report MAC message may be defined to report to the ABS (neighbor AP scan report, interference report, data load report, etc.).

Furthermore, an MAC message related to the mobility support of a multi-RAT terminal may be defined.

Otherwise, such a control message may be transmitted and received by using NonAccess Stratum (NAS) or a control plane message.

(2) Protocols Between ABS and Multi-RAT Terminal

The following procedure may be necessarily required to be defined between the ABS and multi-RAT terminal to provide a higher level of multi-RAT operation of the multi-RAT terminal.

1) Multi-RAT mobility support (scanning, neighbor advertisement message, etc.)

2) Multi-RAT management (configuration, active, turn-off, power, etc.)

3) IP/security binding

Such a process may be also enabled through an MAC message, and may be also configured through an upper level message or NAS message such as OMA DM.

Hereinafter, a method in which the ABS and C-AP proposed in the present disclosure are interlocked with each other based on the foregoing description to allow a multi-RAT terminal to transmit and receive data through the ABS and C-AP will be described in detail.

FIGS. 6 through 9 illustrates a case that a multi-RAT terminal accesses a cellular network via a primary network, and accesses WLAN AP via a secondary network.

FIG. 6 is a flow chart illustrating a data communication method of a multi-RAT terminal in a multi-RAT network according to an embodiment of the present disclosure.

First, a multi-RAT terminal performs a network (re)entry procedure with the ABS (S610). The multi-RAT terminal notifies that it has the capability of accessing WLAN, namely, it is a terminal supporting multi-RAT, through the network (re)entry procedure to the ABS.

Subsequently, the ABS transmits information required for the multi-RAT terminal to access an AP within the ABS coverage to the multi-RAT terminal (S620). Here, the ABS can transmits information on an AP or AP group that can be accessed by the multi-RAT terminal based on a receiving signal level or location of the multi-RAT terminal to the multi-RAT terminal. In other words, the ABS may transmit a Service Set IDentifier (SSID) of the AP, an MAC address, a WEP key, a channel number (frequency information), frequency hopping information, a protocol version (11a/b/n . . . ) of the AP, timing offset information between a beacon and a base station frame, and the like, to the multi-RAT terminal.

Here, timing offset information between a beacon frame and an inter-ABS frame is transmitted to synchronize an ABS frame and a C-AP beacon frame, thereby allowing a multi-RAT terminal to easily find a beacon frame using a relative position of the frame timing of the base station currently being accessed to reduce the power consumption of the multi-RAT terminal.

Here, the ABS may transmit a relative location of the beacon frame by expressing it as a difference from a specific frame time.

For example, a beacon transmission period transmitted by the C-AP may be same as a superframe period of IEEE 802.16m, and moreover, when several APs are set to have an offset different from the same period, it may be also possible to solve the interference problem.

In particular, when the transmission and reception timings of a beacon frame are well adjusted at the ABS and C-AP, it may be possible to solve the co-located co-existence problem occurred in the terminal. In other words, the multi-RAT terminal does not perform uplink transmission to the ABS while the multi-RAT terminal receives key information (such as beacon, etc.) through a wireless LAN. For example, if C-AP beacon and ABS superframe header (BCH) transmission times are the same, a multi-RAT terminal may receive both two information without interference.

Here, assuming that the ABS is an IEEE 802.16 or LTE system, it has a frame period of 5 ms and 10 ms, respectively, but in case of WLAN, it has mostly a beacon transmission period of 102.4 ms. In this case, the ABS and AP are frame-synchronized every 2560 ms.

Here, the ABS notifies each beacon transmission timing of AP in relation with a current frame in a frame offset form to the multi-RAT terminal, thereby allowing the multi-RAT terminal to minimize a time of scanning APs.

Furthermore, the multi-RAT terminal may know the beacon frame information of a neighbor AP located in the vicinity of a currently accessed AP from the ABS, and scan a beacon signal of the neighbor AP even in the state of currently accessing AP. In order to avoid inter-AP interference, the ABS may notify a beacon transmission timing of the neighbor AP to each AP, and each AP may not transmit data at the corresponding timing, thereby avoiding interference.

Furthermore, the procedure of allowing the C-AP to make registration with the ABS may be as follows.

First, an interlock operation between the ABS and C-AP can be carried out in the following two schemes.

(1) The C-AP has its own wired backhaul to transmit and/or receive only control information to and/or from a cellular system via a wireless link with respect to the ABS. :Virtual Carrier Scenario (2) The C-AP operates like a multi-RAT relay to transmit and/or receive both control information and relayed data to and/or from the ABS via a wireless link. :Enhanced Tethering Scenario Also, the procedure of allowing the C-AP to register to the ABS may be as follows.

The C-AP performs the procedure of registering to the ABS when a multi-RAT network is found, namely, when an ABS that can be interlocked with the C-AP itself is found.

The C-AP accesses a cellular system to register the C-AP itself prior to activating a wireless LAN. Otherwise, even when the C-AP has been activated, the C-AP itself may be registered to a cellular system having a higher coverage.

The procedure of registering the C-AP to the ABS may be carried out by exchanging an MAC message between the ABS and C-AP, or implemented even through a higher message. Here, information exchanged through the MAC message may be transmitted to a management entity of the ABS or transmitted to a network entity managing interworking.

Here, the C-AP may transmit its own various information to the ABS. In other words, the C-AP may transmit configuration information or the like to the ABS, and the ABS may notify the information of the C-AP to multi-RAT terminals within the ABS coverage based on this.

Otherwise, the ABS may notify registration procedure-related information directly to the C-AP without using transmission and reception between the ABS and C-AP. In other words, a provider may add the corresponding function to the C-AP similarly to a femto base station, thereby automatically assigning all configurations of the C-AP.

In particular, when the C-AP has its own location information by itself (through LBS, GSS, etc.), the C-AP may send its own location information to the ABS while performing a registration procedure to the ABS. Otherwise, the ABS may receive measurement information related to the location of the C-AP through a technology such as LBS or the like.

Furthermore, the ABS may instruct the C-AP to scan neighbor APs to receive the information of other APs located in the vicinity of the C-AP. Through this, the ABS may estimate a relative location between APs.

Furthermore, providers may know the location of an AP or the like through AP information or the like received from the ABS, thereby estimating the location information of a terminal accessing the corresponding AP on the Internet. For example, it may be used to know the location information of an IP phone in E911 or the like.

Subsequently, the multi-RAT terminal measures a beacon of AP according to the information received from the ABS (S630), and notifies whether or not an access to the AP is available to the ABS (S640). In this case, the multi-RAT terminal measures a receiving signal level for a beacon of the AP, thereby determining whether or not an access to the AP is available.

Here, the method of allowing a multi-RAT terminal to scan APs will be described in detail.

The multi-RAT terminal may consume a lot of time and power to find APs when the multi-RAT terminal does not have any previous information on APs.

Accordingly, the C-AP may transmit a specific signal to a cellular network at a specific timing to allow the multi-RAT terminal to perform cellular communication with the ABS as well as find the C-AP. The multi-RAT terminal may measure the specific signal at a predetermined time to check whether there exists any currently accessible WLAN AP in the vicinity. Here, the specific signal refers to a signal to identify an AP.

For example, there is a case where the ABS does not transmit a preamble at a specific timing to reinforce a location measurement function in IEEE 802.16m, and at this timing, APs may transmit a predetermined signal. Here, the predetermined signal is a signal negotiated in advance with the ABS, which is a signal to know whom the C-AP is based on the kind of signal and transmission timing. The predetermined signal may have a specific pattern based on a location of AP, a frequency band used or the like, and thus if the multi-RAT terminal receives this signal and then reports the received information to the ABS, then the ABS may send a suitable AP list to the multi-RAT terminal.

In particular, when a transmission signal is provided to have 9 different patterns and discern 9 channels in the 2.4 GHz WLAN band, the multi-RAT terminal may receive the corresponding signal and then search only the corresponding one WLAN channel. In this case, the multi-RAT terminal can reduce power consumption for AP scanning.

Furthermore, in addition to the preamble, it may be also possible that the ABS makes a promise not to send a signal to a specific point at a predetermined time, and then allows the C-AP to transmit a predetermined signal to the specific point. In this case, a data transmission point for the C-AP may be notified to the multi-RAT terminal via A-MAP or PDCCH. In this case, the ABS can previously assign STID or C-RNTI for C-AP assignment, and then transmit A-MAP or PDCCH CRC masked with this value to the multi-RAT terminal.

Furthermore, the ABS may allow the C-AP to transmit data, and each C-AP therein to encode its own information (for example, beacon information), thereby transmitting a specific resource. In this case, the ABS can notify a data transmission point for the C-AP via A-MAP or PDCCH. In this case, the ABS can previously assign STID or C-RNTI for C-AP assignment, and then transmit A-MAP or PDCCH CRC masked with this value to the multi-RAT terminal. Accordingly, the multi-RAT terminal may decode a specific burst at a specific point, thereby checking information on neighbor APs.

Subsequently, in case that the receiving level of AP is greater than a predetermined value (or threshold value), the ABS transmits detail access information to the multi-RAT terminal, thereby allowing the multi-RAT terminal to access the AP (S650).

Subsequently, the multi-RAT terminal performs an access procedure with the AP (S660).

Here, the process of allowing the multi-RAT terminal to access an AP under the control of the ABS according to various schemes of the multi-RAT terminal for searching an AP will be described through the following embodiments.

First Embodiment

According to a first embodiment, there is provided a method of allowing the multi-RAT terminal to search an AP by itself to access the AP.

FIG. 7 is a flow chart illustrating the first embodiment.

First, in case that a multi-RAT terminal wants to access an AP due to various reasons, the multi-RAT terminal transmits an access request message for requesting an access to the AP to the ABS (S710).

Subsequently, the ABS transmits a response message including information on AP candidates that can be accessed by the multi-RAT terminal to the multi-RAT terminal according to the status of the multi-RAT terminal (location, battery, signal intensity, etc.) (S720). Here, the response message is a message corresponding to the access request message of the multi-RAT terminal.

Subsequently, the multi-RAT terminal searches (scans or monitors) an AP based on the received response message (S730).

Subsequently, the multi-RAT terminal reports a measurement result of the AP to the ABS (S740).

Subsequently, the ABS transmits detail information required for AP (target AP) assignment and an access to the AP to the multi-RAT terminal using the AP measurement result received from the multi-RAT terminal (S750).

Subsequently, the multi-RAT terminal performs an access procedure with the target AP according to the guide of the ABS (S760).

Second Embodiment

According to a second embodiment, there is provided a method of allowing a multi-RAT terminal to access a specific AP when the AP has been previously searched.

FIG. 8 is a flow chart illustrating the second embodiment.

The multi-RAT terminal transmits information on the searched APs to the ABS (S810, S820). At this time, the multi-RAT terminal may transmit various information (SSID, measurement information, etc.) related to the searched APs to the ABS.

Subsequently, when the APs received from the multi-RAT terminal includes an AP enabled with a coordination operation with the ABS (C-AP), the ABS instructs the multi-RAT terminal to access the AP, and transmits detail information required for accessing the AP to the multi-RAT terminal (S830).

Subsequently, the multi-RAT terminal accesses a target AP according to the guide of the ABS (S840).

Third Embodiment

According to a third embodiment, there is provided a method of allowing a multi-RAT terminal to access an AP when the ABS instructs the multi-RAT terminal to search the AP according to the circumstances of the terminal.

FIG. 9 is a flow chart illustrating the third embodiment.

First, the ABS transmits an instruction message for instructing the search of an AP to the multi-RAT terminal to disperse a load for ABS traffic by taking the status/performance (location, signal intensity, battery, etc.) of the multi-RAT terminal into consideration (S910). Here, the instruction message may include information on candidate APs.

Subsequently, the multi-RAT terminal searches accessible APs based on the instruction message (S920).

Subsequently, the multi-RAT terminal reports a measurement result of the APs to the ABS (S930), and the ABS transmits detail information required for target AP assignment and access to allow the multi-RAT terminal to access the target AP on the basis of the measurement result received from the multi-RAT terminal (S940).

Subsequently, the multi-RAT terminal accesses the target AP according to the guide (or control) of the ABS through an access procedure (S950).

When a multi-RAT terminal has completed an access to AP through the first through third embodiments, the multi-RAT terminal transmits access information for the accessed AP to the ABS (S670). Here, access information on the accessed AP may include an IP address assigned by WLAN.

Subsequently, the ABS registers an IP address of the AP accessed by the multi-RAT terminal to a home agent, and binds a WLAN IP with a cellular IP to implement IP mobility.

If a home agent can control the IP assignment of the WLAN AP, a reserved IP among the IP region of WLAN may be previously assigned to the multi-RAT terminal, and thus the multi-RAT terminal can access WLAN using the previously assigned IP address. In other words, when the multi-RAT terminal wants to transmit data via uplink, the ABS may instruct the multi-RAT terminal to transmit uplink date to the WLAN AP by taking QoS of the flow, current load condition of the ABS, resource efficiency, and the like into consideration.

The above-described embodiments and modification examples may be combined with one another. Accordingly, each embodiment may not be implemented as a single but implemented in combination with one another when the need arises. Such combinations can be easily implemented by those skilled in the art reading this specification and the combinations thereof will not be described below in detail. However, even if not described, it should be understood that the combinations thereof will not be excluded from the present invention, and still fall within the scope of the present invention.

The foregoing embodiments and modification examples may be implemented through various means. For example, the embodiments of the present disclosure may be implemented by hardware, firmware, software, or any combination thereof.

In case of a hardware implementation, a method according to the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In case of a firmware or software implementation, a method according to the embodiments of the present disclosure may be implemented in the form of a module, procedure, function, or the like, which performs the functions or operations as described above. The software codes may be stored in a memory unit to be driven by a processor. The memory unit may be located at an inner or outer portion of the processor to send and/or receive data to and/or from the processor by various publiclyknown means.

For example, the method according to the present invention as described above may be implemented by software, hardware, or a combination of both. For example, the method according to the present invention may be stored in a storage medium (for example, internal memory, flash memory, hard disk, and so on), and may be implemented through codes or instructions in a software program that can be performed by a processor (for example, internal microprocessor). It will be described with reference to FIG. 10.

FIG. 10 is an internal block diagram illustrating a terminal and a base station in a multi-RAT system to which an embodiment of the present disclosure is applicable.

The terminal 10 may include a controller 11, a memory 12, and a radio frequency (RF) unit 13.

The terminal 10 may be fixed or have mobility, and may be referred to as another terminology, such as a user equipment (UE), a user terminal (UT), a subscriber station (SS), a wireless device, an advanced mobile station (AMS), or the like. Furthermore, the terminal may include the multi-RAT terminal.

In addition, the terminal may include a display unit, a user interface, and the like.

The controller 11 implements a proposed function, process and/or method. The layers of a wireless interface protocol may be implemented by the controller 11.

The memory 12 is connected to the controller 11 to store a protocol or parameter for performing wireless communication. In other words, a terminal drive system, applications and general files are stored therein.

The RF unit 13 is connected to the controller 11 to transmit and/or receive radio signals.

Incidentally, the display unit can display various information of the terminal, and use a well-known element such as a liquid crystal display (LCD), organic light emitting diodes (OLEDs), and the like. The user interface can be made of a combination of well-known user interfaces such as a keypad, a touch screen, or the like.

The base station 20, 30 may include a controller 21, a memory 22, and a radio frequency (RF) unit 23.

Here, the base station 20, 30 may generally refer to a fixed station that communicates with the terminal and may be called another terminology, such as a NodeB, a base transceiver system (BTS), an access point, and the like. One or more cells may exist within the coverage of the base station.

The controller 21 implements a proposed function, process and/or method. The layers of a wireless interface protocol may be implemented by the controller 21.

The memory 22 is connected to the controller 21 to store a protocol or parameter for performing wireless communication.

The RF unit 23 is connected to the controller 21 to transmit and/or receive radio signals.

The controller 11, 21 may include an application-specific integrated circuit (ASIC), other chip sets, a logic circuit and/or a data processing device. The memory 12, 22 may include read-only memory (ROM), random access memory (RAM), flash memory, memory card, storage medium and/or other storage devices. The RF unit 13, 23 may include a baseband circuit for processing radio signals. When the embodiment is implemented by software, the foregoing technique may be implemented by a module (process, function, etc.) performing the foregoing function. The module may be stored in the memory 12, 22, and implemented by the controller 11, 21.

The memory 12, 22 may be located inside or outside the controller 11, 21, and connected to the controller 11, 21 using various well-known means.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the concept of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Furthermore, in the present disclosure, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

In the foregoing embodiments, the constituent elements and features of the present disclosure are combined with one another in a predetermined form. Each constituent element or feature thereof should be considered to be selective as unless otherwise particularly specified. Each constituent element or feature thereof may be implemented in a form that is not combined with any other constituent elements or features. Furthermore, an embodiment of the present disclosure may be also configured by combining some of the constituent elements and/or features. The sequence of the operations described in the embodiments of the present disclosure may be changed. Some of the configurations or features of any embodiment may be included in any other embodiments, or may be replaced with the configurations and features corresponding to the any other embodiments. In addition, it will be apparent that an embodiment may be configured by a combination of claims cited by each other and a new claim may be included by the amendment after filing the application.

The invention claimed is:

1. A method for a terminal performing data communication via a first base station (BS) supporting a first radio access technology (RAT) and at least one second BS that is located in the vicinity of the first BS and supports a second RAT in a radio access system supporting a multi-RAT, the method comprising:

performing a network re-entry procedure with the first BS;
receiving control information from the first base station that is required for access to the at least one second BS, the control information comprising offset information that is related to a frame of the first BS, candidates of the at least one second BS and beacon frames of the at least one second BS;
performing a scanning procedure for one or more second BS among the candidates of the at least one second BS by using the received offset information;
receiving an instruction message from the first base station that requests access to the at least one second BS; and
performing an access procedure with the scanned one or more second BS,
wherein the frame of the first BS and beacon frames of the candidates of the at least one second BS are synchronized by using the offset information,
wherein the candidates of the at least one second BS are set to have a different offset during a same period by using the offset information, and
wherein the candidates of the at least one second base stations are determined according to a status of a terminal supporting multi-RAT.

2. The method of claim 1, wherein the control information further comprises at least a Service Set IDentifier (SSID), a MAC address, a Wired Equivalent Privacy (WEP) key, frequency information, frequency hopping information or protocol version information.

3. The method of claim 1, further comprising:
requesting that the first BS access the at least one second BS, wherein performing the scanning procedure comprises:
scanning for the at least one second BS, and
transmitting a scanning execution result to the first BS.

4. The method of claim 1, wherein performing the scanning procedure comprises:
receiving a message from the first BS that requests to scan for the at least one second BS;
scanning for the at least one second BS; and
transmitting a scanning execution result to the first BS.

5. The method of claim 1, further comprising:
performing data communication via a first carrier with the first BS; and
performing data communication via a second carrier with the accessed one or more second BS.

6. The method of claim 1, wherein:
the first RAT is a radio access technology supporting a cellular system; and
the second RAT is a radio access technology supporting a wireless local area network (WLAN).

7. The method of claim 1, wherein the first BS and the at least one second BS are connected to each other over wired or wireless connections.

8. The method of claim 1, wherein the control information further comprises an identification signal identifying each of the at least one second BS.

9. The method of claim 1, wherein the control information further comprises information indicating a data transmission point of the at least one second BS.

10. The method of claim 9, wherein the information is received via a Physical Downlink Control CHannel (PDCCH) or Advanced MAP (A-MAP).

11. The method of claim 10, wherein the PDCCH or the A-MAP is Cyclic Redundancy Check (CRC) masked with a STation IDentifier (STID) or Cell Radio Network Temporary Identifier (C-RNTI).

12. The method of claim 1, wherein information for notifying multi-RAT support is transmitted to the first BS via the network re-entry procedure.

13. A method for transmitting and receiving data via a first base station BS supporting a first radio access technology (RAT) and at least one second BS that is located in the vicinity of the first BS and supports a second RAT in a radio access system supporting a multi-RAT, the method comprising:
- the at least one second BS performing a registration procedure with the first BS;
- the second BS transmitting first configuration information to the first BS
- the first BS transmitting second configuration information to a terminal supporting multi-RAT;
- performing an access procedure with the terminal; and
- performing data communication via a virtual carrier with the terminal;
- wherein performing the access procedure comprises:
  - searching for the first BS capable of communicating with the at least one second BS; and
  - registering to the searched first BS using a MAC message,
- wherein the second configuration information comprises offset information that is related to a frame of the first BS, candidates of the at least one second BS and beacon frames of the at least one second BS,
- wherein the frame of the first BS and beacon frames of the candidates of the at least one second BS are synchronized by using the offset information,
- wherein the candidates of the at least one second BS are set to have a different offset during a same period by using the offset information, and
- wherein the candidates of the at least one second BS are determined according to status of the terminal.

14. The method of claim 13, wherein:
- a transmission period of a beacon frame and transmission period of a downlink frame or downlink sub-frame of the first BS have relative timing offset intervals; and
- the virtual carrier is distinguished from a carrier performing data communication between the first BS and the terminal.

15. The method of claim 13, wherein:
- information required for access to the terminal is exchanged with the first BS, the information comprising at least location information related to the at least one second BS or information related to second BSs located in the vicinity of the at least one second BS.

16. A terminal for transmitting and receiving data via a first base station (BS) supporting a first radio access technology (RAT) and at least one second BS that is located in the vicinity of the first BS and supports a second RAT in a radio access system supporting a multi-RAT, the terminal comprising:
- a wireless communication unit that transmits and receives wireless signals; and
- a controller that:
- performs a network re-entry procedure with the first BS;
- controls the wireless communication unit to receive control information from the first base station that is required for access to the at least one second BS, the control information comprising offset information that is related to a frame of the first BS, candidates of the at least one second BS and beacon frames of the at least one second BS;
- performs a scanning procedure for one or more second BS among the candidates of the at least one second BS by using the received offset information;
- controls the wireless communication unit to receive an instruction message from the first base station that requests access to the second BS; and
- performs an access procedure with the scanned one or more second BS,
- wherein the frame of the first BS and beacon frames of the candidates of the at least one second BS are synchronized by using the offset information,
- wherein the candidates of the at least one second BS are set to have a different offset during a same period by using the offset information, and
- wherein the candidates of the at least one second BS are determined according to a status of a terminal supporting multi-RAT.

17. The terminal of claim 16, wherein the first BS and the at least one second BS are connected to each other over wired or wireless connections.

* * * * *